US008839218B2

(12) United States Patent
Bowler et al.

(10) Patent No.: US 8,839,218 B2
(45) Date of Patent: *Sep. 16, 2014

(54) DIAGNOSING ALIAS VIOLATIONS IN MEMORY ACCESS COMMANDS IN SOURCE CODE

(75) Inventors: Christopher E. Bowler, Markham (CA); Raymond Ying Chau Mak, Thornhill (CA); Sean Douglas Perry, Toronto (CA); Ettore Tiotto, Thornhill (CA); Enrique Varillas, North York (CA)

(73) Assignee: International Business Machines Corporation, Armonk, NY (US)

( * ) Notice: Subject to any disclaimer, the term of this patent is extended or adjusted under 35 U.S.C. 154(b) by 1412 days.

This patent is subject to a terminal disclaimer.

(21) Appl. No.: 11/757,952

(22) Filed: Jun. 4, 2007

(65) Prior Publication Data

US 2008/0301657 A1    Dec. 4, 2008

(51) Int. Cl.
   *G06F 9/45*         (2006.01)
   *G06F 11/36*        (2006.01)
(52) U.S. Cl.
   CPC ............ *G06F 8/443* (2013.01); *G06F 11/3604* (2013.01); *G06F 11/3624* (2013.01)
   USPC ........................................................ 717/158
(58) Field of Classification Search
   CPC .................................................... G06F 8/443
   USPC ........................................................ 717/158
   See application file for complete search history.

(56) References Cited

U.S. PATENT DOCUMENTS

| 5,293,629 A | 3/1994 | Conley et al. |
|---|---|---|
| 5,583,988 A | 12/1996 | Crank et al. |
| 5,768,596 A | 6/1998 | Chow et al. |
| 5,778,212 A | 7/1998 | Dehnert et al. |
| 6,202,202 B1 | 3/2001 | Steensgaard |
| 6,487,713 B1 | 11/2002 | Cohen et al. |
| 6,665,865 B1 | 12/2003 | Ruf |
| 6,718,542 B1 | 4/2004 | Kosche et al. |
| 6,880,154 B2 | 4/2005 | Ghosh et al. |
| 6,986,126 B2 | 1/2006 | Kosche et al. |
| 7,493,607 B2 | 2/2009 | Moritz |

(Continued)

OTHER PUBLICATIONS

Diwan et al., "Type-Based Alias Analysis", Proceedings of the ACM SIGPLAN 1998 Conference on Programming Language Design and Implementation PLDI, vol. 33, Issue 5, May 1998, pp. 106-117.

(Continued)

*Primary Examiner* — John Chavis
(74) *Attorney, Agent, or Firm* — Yee & Associates, P.C.; Parashos Kalaitzis

(57) ABSTRACT

A computer implemented method, apparatus, and computer usable program code for facilitating debugging of source code. A set of indirect memory references is identified in the source code and points-to records are generated for the source code. The set of indirect memory references are validated using the points-to records and an aliasing rule to identify zero or more indirect memory references having a potential aliasing problem. In a case in which the zero or more indirect memory references comprise at least one indirect memory reference, the at least one indirect memory reference is in the set of indirect memory references. Responsive to a determination that the zero or more indirect memory references comprise at least one indirect memory reference, a report is generated identifying at least one location in the source code associated with the at least one indirect memory reference. The report is stored.

24 Claims, 6 Drawing Sheets

(56) References Cited

U.S. PATENT DOCUMENTS

| | | | |
|---|---|---|---|
| 7,516,448 | B1 | 4/2009 | Chan et al. |
| 7,555,748 | B2 | 6/2009 | Archambault et al. |
| 7,617,496 | B2 | 11/2009 | Gonion |
| 7,752,613 | B2 | 7/2010 | Guo et al. |
| 7,757,225 | B2 | 7/2010 | Copeland et al. |
| 8,006,239 | B2 | 8/2011 | Sankaranarayanan et al. |
| 8,185,881 | B2 | 5/2012 | Brand et al. |
| 2004/0010782 | A1 | 1/2004 | Moritz |
| 2004/0015902 | A1 | 1/2004 | Kosche et al. |
| 2004/0205740 | A1 | 10/2004 | Lavery et al. |
| 2006/0004996 | A1 | 1/2006 | Gonion |
| 2006/0048103 | A1 | 3/2006 | Archambault et al. |
| 2008/0134159 | A1 | 6/2008 | Guo et al. |
| 2009/0271763 | A1 | 10/2009 | Varma et al. |
| 2010/0162219 | A1* | 6/2010 | Bowler et al. ................. 717/154 |
| 2011/0035733 | A1* | 2/2011 | Horning et al. ............... 717/140 |

OTHER PUBLICATIONS

Avots et al., "Improving Software Security with a C Pointer Analysis", Software Engineering, ICSE '05, Proceedings of the 27th International Conference, May 15-21, 2005, pp. 332-341.

Diwan et al., "Using Types of Analyze and Optimize Object-Oriented Programs", ACM Transactions on Programming Languages and Systems (TOPLAS), vol. 23, Issue 1, Jan. 2001, pp. 30-72.

Palsberg, "Type-Based Analysis and Applications", Proceedings of the 2001 ACM SIGPLAN-SIGSOFT workshop on Program Analysis for Software Tools and Engineering, PASTE '01, Jun. 2001, pp. 20-27.

Goldberg et al., "Software Bubbles: Using Predication to Compensate for Aliasing in Software Pipelines", Proceedings of the 2002 International Conference on Parallel Architectures and Compilation Techniques (PACT '02),, Parallel Architectures and Compilation Techniques (PACT '02), Sep. 22-25, 2002, pp. 211-221.

Guo et al., "Practical and Accurate Low-Level Pointer Analysis", Proceedings of the International Symposium on Code Generation and Optimization (CGO '05), Mar. 20-23, 2005, pp. 291-302.

Hummel et al., "A Language for Conveying the Aliasing Properties of Dynamic, Pointer-Based Data Structures", Parallel Processing Symposium, Proceedings of the 8th International Conference, Apr. 26-29, 1994, pp. 208-216.

Fernandez et al., "Speculative Alias Analysis for Executable Code", Proceedings of the 2002 International Conference on Parallel Architectures and Compilation Techniques (PACT '02), Sep. 22-25, 2002, pp. 222-231.

Woo et al., "Alias Analysis on Type Inference for Class Hierarchy in Java", Computer Science Conference, 2001, ACSC 2001, Proceedings 24th Australian, Jan. 29-Feb. 4, 2001, pp. 206-214.

Marlowe et al., "Hybrid Incremental Alias Algorithms", Proceedings of the 24th Annual Hawaii International Conference on vol. ii, System Sciences, vol. 2, Jan. 8-11, 1991, pp. 428-437.

Richardson et al., "Code Optimization Across Procedures", Computer, vol. 22, Issue 2, Feb. 1989,pp. 42-50.

Livshits et al., "Tracking Pointers with Path and Context Sensitivity for Bug Detection in C Programs", ACM SIGSOFT Software Engineering Notes, Proceedings of the 9th European Software Engineering Conference held jointly with 11th ACM SIGSOFT International Symposium on Foundations of Software Engineering ESEC/FSE-11, vol. 28, Issue 5, pp. 317-326.

Martin et al., "Finding Application Errors and Security Flaws Using PQL: a Program Query Language", Proceedings of the 20th Annual ACM SIGPLAN Conference on Object Oriented Programming, Systems, Languages, and Applications (OOPSLA '05), vol. 40, Issue 10, Oct. 2005, pp. 365-383.

Dhurjati et al., "Enforcing Alias Analysis for Weakly Typed Languages," Technical Report UIUCDCS-R-2005-2657, Computer Science Department, University of Illinois, Nov. 2005, 23 pages.

"GCC 4.1 Release Series Changes, New Features, and Fixes," Sep. 19, 2007, 10 pages. Retrieved Apr. 10, 2008 from http://gcc.gnu.org/gcc-4.1/changes/html.

Liu et al., "UML-Based Alias Control," Technical Report RPI/DCS-06-10, Rensselaer Polytechnic Institute, Sep. 2006, 12 pages.

Xue et al., "Completeness Analysis for Incomplete Object-Oriented Programs," Proceedings of the 14th International Conference on Complier Construction (CC '05), Apr. 2005, pp. 271-286.

Xue et al., Interprocedural Side-Effect Analysis for Incomplete Object-Oriented Software Modules, The Journal of Systems and Software, vol. 80, No. 1, Jan. 2007, pp. 92-105.

Office Action, dated Jul. 13, 2012, regarding U.S. Appl. No. 12/337,939, 20 pages.

Final Office Action, dated Dec. 21, 2012, regarding U.S. Appl. No. 12/337,939, 40 pages.

Final Office Action, dated Jun. 5, 2014, regarding U.S. Appl. No. 12/337,939, 46 pages.

* cited by examiner

Figure 1
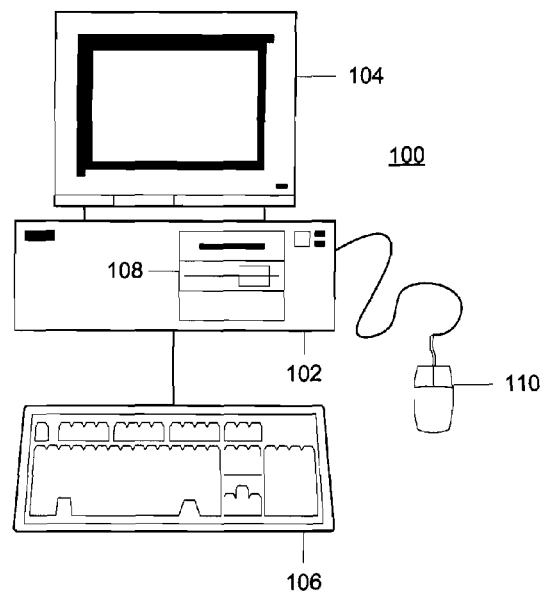
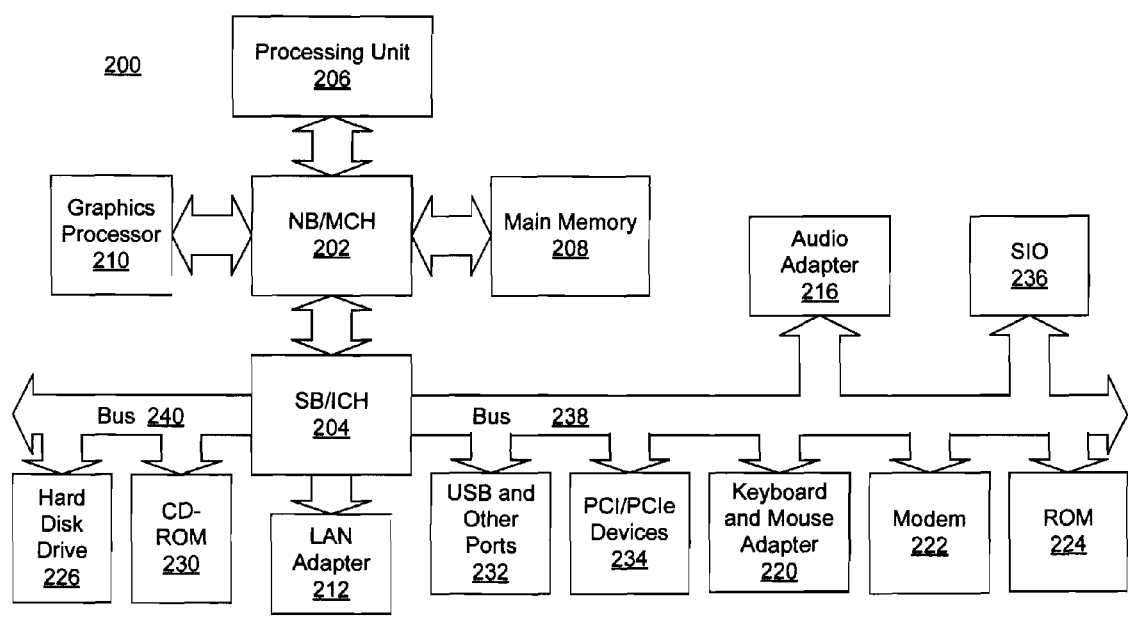
Figure 2

Figure 3

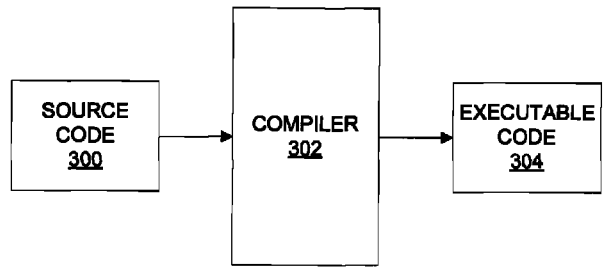

Figure 4

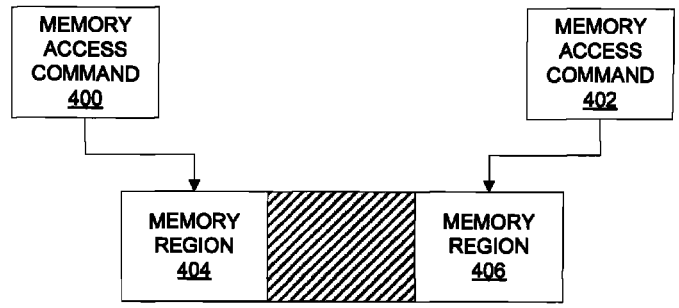

Figure 5

```
1  int main() {
2   int i = 42;
3   int *pi = &i;
4   *pi = 78;
5   return 0;
6  }
```

Figure 6

```
1  int main() {
2   int i = 42;
3   float* pf = (float*)&i;
4   *pf = 3.14;
5   foo(i); // what value is passed to foo?
6   return 0;
7  }
```

Figure 7

```
1  int main() {
2   int i = 42;
3   float* pf = (float*)&i;
4   int* pi = (int*)pf;
5   *pi = 3;  // indirect write is safe
6   return 0;
7  }
```

Figure 8 line 4.3: 1540-0590 (I) Dereference may not conform to the current aliasing rules.
line 4.3: 1540-0591 (I) The dereferenced expression has type "float". "pf" may point to "i" which has incompatible type "int".
line 4.3: 1540-0592 (I) Check assignment at line 3 column 13.

Figure 9

```
int i;
int* pi = &i;
```

DIAGNOSING ALIAS VIOLATIONS IN MEMORY ACCESS COMMANDS IN SOURCE CODE

BACKGROUND OF THE INVENTION

1. Field of the Invention

The present invention relates generally to an improved data processing system and in particular to the compilation of computer usable program code. Still more particularly, the present invention relates to diagnosing alias violations in memory access commands during an optimizing compilation process.

2. Description of the Related Art

Compilers are software programs used to translate program instructions written in a source language to equivalent program instructions written in a target language. The source language is a high-level language designed to be interpreted by humans, the target language is usually a low-level language suitable for execution by computer hardware. Thus, the compiler is said to compile the source code into executable code.

Optimizing compilers are used to improve the quality of the program instruction generated without changing the intended meaning of the source code. For example, an optimizing compiler can reduce the time required to execute the program instructions or the memory footprint of the resulting program. During the optimization process, the source code is often re-ordered so that commands are executed more efficiently.

In the process of translating source code to target code, compilers routinely reorder program instructions to improve the runtime performance of the generated target code. Because instruction reordering may not preserve the original semantics of a program, a compiler must determine that reordered instructions do not reference the same or overlapping memory regions before reordering can be performed. For example, a store instruction can be safely moved prior to a subsequent load instruction if the compiler can determine that the memory region to which the store instruction writes and the memory region which is read by the load instruction do not overlap. If the instructions do reference the same memory region, then reordering could cause the reordered program to perform incorrectly. For example, reordering could cause a new value to be stored in memory before an instruction to load from the same memory is executed, when the value expected to be loaded was the older value (i.e., before the older value was overwritten by the new value). However, some reordered instructions may reference the same memory region. Additionally, two load instructions referencing the same memory region can be freely interchanged, or reordered, if no intervening store instruction to that memory region exists.

A memory region refers to a memory address and size which defines a contiguous block of memory. A read or write instruction to a memory region may be referred to as a memory access. In the context of this application an indirect memory access command or reference refers to one of a set of memory regions and a direct memory access command or reference refers to a single memory region.

Two or more memory accesses which refer to memory regions which overlap are said to alias one another. The presence of aliasing limits the amount of reordering a compiler can safely perform. The alias set of a memory access in a program is the set of the other memory accesses in that program which may refer to a memory region which overlaps with the memory region referred to by that memory access.

A compiler does not always detect all problems that can be caused by aliasing. Determining all possible aliasing relationship in a program is often computationally intractable. Therefore, programming languages have established rules, known as alias rules, which describe which memory references may alias one another. Additionally, compilers often allow the user to choose an alias rule to which the source program must conform. Thus, an alias rule represents a "contract" between the programmer and the compiler. If the program being compiled does not conform to the chosen alias rule, then the compiler might optimize the program in such a way as to modify the original semantics, or meaning, of the program.

Furthermore, aliasing violations often prove costly as unexpected program behavior may only appear at the highest levels of optimization, or in time as code optimizers evolve and take advantage of previously unexploited opportunities. The term highest optimization levels refer to a highest degree of code rearrangement performed by a compiler to maximize efficiency of the resulting executable code.

SUMMARY OF THE INVENTION

The aspects of the present invention provide for a computer implemented method, apparatus, and computer usable program code for facilitating debugging of source code. A set of indirect memory references is identified in the source code and points-to records are generated for the source code. The set of indirect memory references are validated using the points-to records and an aliasing rule to identify zero or more indirect memory references having a potential aliasing problem. In a case in which the zero or more indirect memory references comprise at least one indirect memory reference, the at least one indirect memory reference is in the set of indirect memory references. Responsive to a determination that the zero or more indirect memory references comprise at least one indirect memory reference, a report is generated identifying at least one location in the source code associated with the at least one indirect memory reference. The report is stored.

In another illustrative embodiment the report further includes trace back information. In another illustrative embodiment the trace back information includes a program symbol which the first indirect memory reference is not allowed to alias according to the aliasing rule. In this case, the program symbol refers to a memory region to which the first indirect memory reference also refers.

In another illustrative embodiment the trace back information includes a sequence of statement locations in the source code related to the first indirect memory reference. In another illustrative embodiment the trace back information includes a program symbol which the first indirect memory reference is not allowed to alias according to the aliasing rule. In this case, the program symbol refers to a memory region to which the first indirect memory reference also refers, and the trace back information includes a sequence of statement locations in the source code related to the first indirect memory reference. In another illustrative embodiment validating is further performed using a directed graph built using the points-to records.

Another illustrative embodiment provides for a computer implemented method for facilitating debugging of source code. An alias analysis is performed of the source code to generate points-to records having points-to information. A directed graph is constructed based on the points-to records. The directed graph includes edges and points-to entries. The edges and points-to entries are annotated in the directed graph with coordinate information. The points-to entries are propagated in the directed graph along the edges. An aliasing rule is applied to identify, using the directed graph, zero or more lines of code containing a potential aliasing violation. In a case in which the zero or more lines of code include at least one line of code, the at least one line of code is in the source code. A report is generated. The report includes an identification of the zero or more lines of code. The report is stored.

In another illustrative embodiment, when the zero or more lines of code include at least one line of code, the report further includes trace back information. The trace back information includes locations of program statements in the source code that lead to the potential aliasing violation.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a data processing system in which the aspects of the present invention may be implemented;

FIG. 2 is a block diagram of a data processing system in which aspects of the present invention may be implemented;

FIG. 3 is a block diagram of a prior art compiler, in which the present invention may be implemented;

FIG. 4 is a block diagram illustrating aliasing in two memory regions;

FIG. 5 illustrates prior art C/C++ pseudo code having an indirect memory access;

FIG. 6 illustrates prior art C/C++ pseudo code containing a potential alias violation under the standard type-based alias rule;

FIG. 7 illustrates prior art C/C++ pseudo code containing type casts;

FIG. 8 is exemplary output of a compiler program which traces back to source code a potential aliasing violation, in accordance with an illustrative embodiment;

FIG. 9 is pseudo code illustrating a points-to primitive in a C or C++ programming language in accordance with an illustrative embodiment;

DETAILED DESCRIPTION OF THE PREFERRED EMBODIMENT

Figure 10:
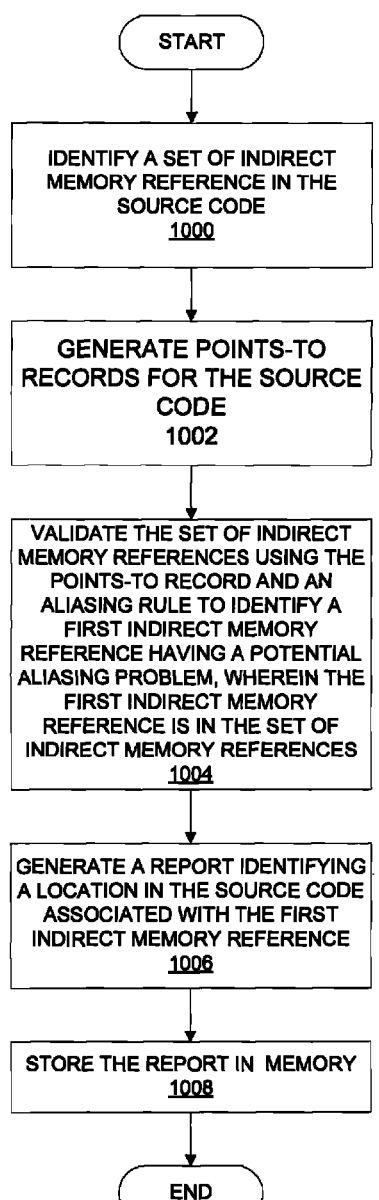
FIG. 10 is a flowchart illustrating a process of facilitating debugging of source code, in accordance with an illustrative embodiment.

With reference now to the Figures and in particular with reference to FIG. 1, a pictorial representation of a data processing system is shown in which the aspects of the present invention may be implemented. Computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 may be any suitable computer, such as an IBM® eServer™ computer or IntelliStation® computer, which are products of International Business Machines Corporation, located in Armonk, N.Y. Although the depicted representation shows a personal computer, other embodiments of the present invention may be implemented in other types of data processing systems, such as a network computer. Computer 100 also preferably includes a graphical user interface (GUI) that may be implemented by means of systems software residing in computer readable media in operation within computer 100.

With reference now to FIG. 2, a block diagram of a data processing system is shown in which aspects of the present invention may be implemented. Data processing system 200 is an example of a computer, such as computer 100 in FIG. 1, in which code or instructions implementing the processes of the present invention may be located. In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the present invention may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The aspects of the present invention provide for a computer implemented method, apparatus, and computer usable program code for compiling source code. The methods of the present invention may be performed in a data processing system, such as data processing system 100 shown in FIG. 1 or data processing system 200 shown in FIG. 2.

As used herein, the following terms have the following meanings:

A "compiler" is a computer program that translates a series of program instructions written in a source computer language into program instructions written in a target computer language, or otherwise modifies the code of the source code. A "compiler" can also be an "optimizing compiler."

An "optimizing compiler" is a computer program that modifies program source code in order to generate executable code that makes efficient use of the hardware resources available on the target machine. The word "optimization" and related terms are terms that refer to improvements in speed, size, and/or efficiency of a computer program, and do not purport to indicate that a computer program has achieved, or is capable of achieving, an "optimal" or perfectly speedy/perfectly efficient state.

The terms "alias" and "aliasing" refer to a situation in which memory access commands access memory regions that overlap each other.

"Alias analysis" is a technique in compiler theory, used to determine if a storage location may be accessed in more than one manner. Two pointers are said to be aliased if the two pointers point to overlapping memory locations.

"Points-to information" describes to which set of memory regions a memory access command can potentially point. If more than one memory region can possibly exist, the particular memory region cannot, in general, be statically determined.

The aspects of the present invention provide for a computer implemented method, apparatus, and computer usable program code for facilitating debugging of source code. The aspects of the present invention can be implemented in a data processing system, such as data processing system 100 in FIG. 1 or data processing system 200 in FIG. 2.

In an illustrative example, a set of indirect memory references is identified in the source code and points-to records are generated for the source code. The set of indirect memory references are validated using the points-to records and an aliasing rule to identify zero or more indirect memory references having a potential aliasing problem. In a case in which the zero or more indirect memory references comprise at least one indirect memory reference, the at least one indirect memory reference is in the set of indirect memory references. Responsive to a determination that the zero or more indirect memory references comprise at least one indirect memory reference, a report is generated identifying at least one location in the source code associated with the at least one indirect memory reference. The report is stored.

In the illustrative embodiments described herein, the result of a points-to analysis is a starting point information used for the propagation of source coordinate data. As described herein, the points-to analysis is used such that the content of an alias set can be traced back to the origin in the source code of the alias set.

The illustrative embodiments provide for attaching or labeling coordinate information to the point-to entries of the directed graph as the points-to entries are propagated through the directed graph. This mechanism of recording the coordinate information to the entries and augmenting the coordinate information as points-to entries move along the directed graph through the graph edges allows one to provide trace back information. The trace back information includes, among other features, the line in the source code which contains the potential aliasing violation. Note that what is propagated through the edges in the directed graph are the point-to entries which acquire the coordinate information associated with the graph edges they traverse.

FIG. 3 is a block diagram of a known compiler. Source code 300 is created by one or more of a number of known techniques, such as automatically, or by a human programmer. Compiler 302 and executable code 304 are computer usable programs that can be used in a data processing system, such as data processing system 100 in FIG. 1 or data processing system 200 in FIG. 2.

Source code 300 defines how a program will eventually operate, but source code 300 is usually not in a desired format for execution on a data processing system. Instead, source code 300 is often in a format that is easier for a human to interpret. After source code 300 has been defined, source code 300 is provided to compiler 302. A typical compiler is a computer program that translates a series of statements written in a first computer language, such as source code 300, into a second computer language, such as executable code 304. The second computer language, such as executable code 304, is often called the object or target language.

Thus, compiler 302 is, itself, a computer program designed to convert source code 300 into executable code 304. After compiler 302 has performed its programmed actions on source code 300, compiler 302 outputs executable code 304. Executable code 304 is generally in a desired computer-usable format and is ready for use in a data processing system.

Typical compilers output objects that contain machine code augmented by information about the name and location of entry points and external calls to functions not contained in the object. A set of object files, which need not have come from a single compiler provided that the compilers used share a common output format, may then be linked together to create the final executable code. The executable code can then be run directly by a user.

Most compilers translate a source code text file, written in a high level language, to object code or machine language, such as into an executable .EXE or .COM file that may run on a computer or a virtual machine. However, translation from a low level language to a high level language is also possible. Such a compiler is normally known as a decompiler if the compiler is reconstructing a high level language program which could have generated the low level language program. Compilers also exist which translate from one high level language to another high level language, or sometimes to an intermediate language that still needs further processing.

FIG. 4 is a block diagram illustrating aliasing in two memory regions. Memory access command 400 and 402 can be implemented using source code 300 or executable code 304 in a data processing system, such as data processing system 100 shown in FIG. 1 or data processing system 200 shown in FIG. 2. Memory region 404 and memory region 406 are memory regions within a memory of a data processing system, such as data processing system 100 shown in FIG. 1 or data processing system 200 shown in FIG. 2.

Memory access command 400 and memory access command 402 each attempt to access two different memory regions, memory region 404 and memory region 406. Memory region 404 and memory region 406 overlap as shown by the hatch marks. Because memory access command 400 and memory access command 402 access overlapping memory regions, memory access command 400 and memory access command 402 are said to alias one another. Thus, the term alias or aliasing refers to a situation in which memory access commands access memory regions that overlap each other. The presence of such aliasing limits the amount of reordering a compiler can safely perform.

The reason for this limitation on reordering is that reordering of instructions can result in memory access command 400 reading memory region 404 before memory access command 402 writes memory region 406, when it was intended by the programmer that memory access command 400 would read the value written by memory access command 402. In this event, the original program semantics would have been altered, thereby causing the program to produce unexpected results. In order to avoid this problem, compilers will not reorder dependent instructions. FIGS. 5-7 demonstrate this concept with examples of code.

Note that the limitation regarding reordering of instructions that access the same memory regions applies to dependent store/load pairs of instructions and store/store pairs of instructions. Two load instructions referencing the same memory region can be freely interchanged, or reordered, if no intervening store instruction to that memory region exists.

Additionally, memory access commands are governed by aliasing rules. An aliasing rule defines how memory access commands can alias each other; that is, an aliasing rule specifies whether two memory access commands, as coded in the source program, are allowed to potentially access the same or overlapping memory locations. The aliasing rule restricts how the programmer may code the source program. Violation of such rules might lead to invalid, or non-conforming, programs. An implementation of this invention diagnoses occurrences of such potential violations.

The standard aliasing rule used by the C and C++ programming languages is the type-based aliasing rule. A type-based aliasing rule is not the only aliasing rule possible for a programming language. A compiler can always provide other aliasing rules, chosen, for example, by compiler options for the programmer to use. These other aliasing rules can be different than the type-based aliasing rule, or they can be more relaxed or more restrictive than the type-based aliasing rule. The illustrative embodiments described herein can be used on any aliasing rule. Using the illustrative embodiments described herein on the type-based aliasing rule is one implementation of an illustrative embodiment of this invention.

FIG. 5 illustrates prior art C/C++ pseudo code having an indirect memory access. The C/C++ pseudo code shown in FIG. 5 can be implemented using a data processing system, such as data processing system 100 shown in FIG. 1 or data processing system 200 shown in FIG. 2. The C/C++ pseudo code shown in FIG. 5 conforms to the standard "type-based aliasing rules" which are used by the compiler to define the alias set for the indirect memory access in the program.

As shown in FIG. 5, according to the type-based aliasing rule, the write to the variable "i" on line 2 aliases the write to pointer variable "*pi" on line 4 because the type of "pi" is "int*" and the type of "i" is "int". In general, whether a program honors type-based aliasing rules of a programming language cannot be determined statically. Hence, the type-based aliasing rules are assumed by the compiler and guaranteed by the program author. A program that violates the type-based aliasing rules might be optimized, or reordered, in such a way as to cause an undesired change in program semantics after program optimization by the compiler.

FIG. 6 illustrates prior art C/C++ pseudo code containing a potential alias violation under the standard type-based alias rule. The pseudo code shown in FIG. 6 can be implemented using a data processing system, such as data processing system 100 shown in FIG. 1 or data processing system 200 shown in FIG. 2.

The pseudo code shown in FIG. 6 is written in a C or C++ programming language. The pseudo code shown in FIG. 6 demonstrates an example of an aliasing violation through a type-cast. In particular, the assignment to variable "i" on line 2 does not alias the write command to pointer variable "*pf" on line 4 when the type-based aliasing rules of the C or C++ programming language are used. Nevertheless, an optimizing C or C++ compiler may choose to reorder these two write commands, leading to an unexpected value of "i" after line 4.

In the past, one way compilers have dealt with such aliasing violations for C or C++ programs is to diagnose type-casts between incompatible pointer types, as on line 3 in FIG. 6. This approach is limited, as the type-cast is not the real problem. Although a type-cast is often a precursor to an illegal indirect memory reference (or dereference), a subsequent type-cast may ensure that the indirect memory access is aliased appropriately.

FIG. 7 illustrates prior art C/C++ pseudo code containing type casts. The pseudo code shown in FIG. 7 can be implemented using a data processing system, such as data processing system 100 shown in FIG. 1 or data processing system 200 shown in FIG. 2.

The C/C++ pseudo code shown in FIG. 7 illustrates that two consecutive type-casts may cause the indirect memory reference at line 5 to be aliased appropriately. The example of FIG. 7 illustrates the disadvantages of detecting aliasing rule violations by the presence of type-casts. In particular, diagnostic messages may be emitted when no alias violation has actually occurred. Additionally, the diagnostic emitted to report type-casts between incompatible pointer types may prove to be too verbose to be useful. Furthermore, the removal of type-casts may prove difficult, as the program design may be heavily dependent on use of the type-casts.

Note that type-casts are not inherently unsafe. Instead, a subsequent indirect memory reference (dereference) of the casted-to pointer makes a type-cast unsafe (that is when the standard type-based aliasing rule are used).

Aliasing violations often prove costly as sometimes the effect of the violation only appears at the highest optimization levels, or in time as code optimizers evolve to take advantage of previously unexploited code specialization or optimization opportunities. Thus, the problematic source code may have to be corrected when a more aggressive optimizing compiler is used to compile the problematic source code.

For example, a new compiler may be distributed to a customer, and the customer uses the new or more aggressive compiler to recompile the customer's existing source code, in the hope of exploiting the advanced capability of the compiler to generate a faster executable program. When the source code contains existing aliasing violations the recompiled program might not behave correctly; not because the compiler is faulty, but simply because the more aggressive optimizing compiler exposes an existing aliasing violation in the source code.

To correct the failure, the program may be recompiled using a less restrictive alias rule. For example, a compiler may provide an option that indicates all indirect memory accesses in a program alias one another. The use of such a relaxed aliasing rule, however, may severely impact the performance improvements a compiler can achieve. For this reason, correcting the aliasing violations in the program source is preferred, although this is often a difficult and time consuming task. Consequently, a technique for detecting violations of the preferred aliasing rules at compile time, such as the techniques disclosed in the illustrative embodiment herein, can save a tremendous amount of development time.

FIG. 8 is exemplary output of a compiler program which traces back to source code a potential aliasing violation, in accordance with an illustrative embodiment. The exemplary output shown in FIG. 8 can be generated by the algorithm shown in FIGS. 10-12, and in the examples shown in FIG. 13 and FIG. 14. In particular, the exemplary output shown in FIG. 8 can correspond to the output of the algorithms described herein, after application of the exemplary algorithms to the pseudo code shown in FIG. 6. Thus, the output shown in FIG. 8 corresponds to an exemplary report which refers to the exact lines where an aliasing violation might appear in the original pseudo code before compilation has occurred.

The exemplary output shown in FIG. 8 is powerful in that the exemplary output not only reports the line corresponding to the illegal dereference (indirect memory reference) at line 4 (under the type-based aliasing rules), but also reports the pointer assignment at line 3. The exemplary output also reports line 3 because at line 3 the pointer variable "pf" assumes the address of variable "i". In a complex source code, simply diagnosing the point of the dereference, which in FIG. 6 is at line 4, has limited usefulness given the complexity of the code. To correct the program, the programmer identifies where in the program a type-cast exists between incompatible pointer types. In other words, the programmer traces back the program execution until the type cast is found. In a complex program, this process can be onerous. However, in the illustrative example shown in FIG. 8, the report issued identifies the source location of all these assignments, rendering the task of correcting the faulty source code much easier.

Unlike the example shown in FIG. 6, a diagnostic for the valid C/C++ program shown in FIG. 7 is not emitted because two type-casts are now used to avoid the aliasing violation. Thus, in large applications where the number of potentially dangerous type-casts can be large, the illustrative embodiments described herein reduce the verbosity of reports resulting from false positives. The false positives result from a diagnostic that simply reports assignments, through a type-cast, between incompatible pointer types.

The output shown in FIG. 8 constitutes a trace back that traces potential aliasing violations back to the original source code. Additionally, the trace back provides the program symbols which the indirect memory access commands used in violating the aliasing rule. The trace back also provides a sequence of program statement locations to help the user understand how the aliasing violation arose, and to help the user determine how to eliminate the aliasing violation. In an illustrative example, the trace back provides a determination of how the aliasing violation arose.

Thus, the illustrative embodiments described herein provide for a compiler to detect and diagnose possible violations of the preferred aliasing rules in a computer program. More specifically, the illustrative embodiments described herein allow the compiler to generate a report identifying the locations, in source code, of the indirect memory access commands that violate the aliasing rules that apply to the program defined by the source code. The report also identifies the sequence of program statements leading to the incorrect memory access commands.

Current optimizing compilers use alias analysis to determine whether a program transformation can be safely carried out without changing the original program semantics. The set of transformations applied to the program depends on the aliasing rules to which the program adheres. The semantics of a conforming program are guaranteed to be preserved by the optimizer; however, no such guarantee is made for a non-conforming program.

The methods of the illustrative embodiments described herein are able to effectively diagnose non-conforming programs that do violate aliasing rules. The algorithms described herein allow the identification of the program statements in source code that may lead to an illegal indirect memory access.

FIG. 9 is pseudo code illustrating a points-to primitive in a C or C++ programming language in accordance with an illustrative embodiment. The pseudo code shown in FIG. 9 can be implemented using a data processing system, such as data processing system 100 shown in FIG. 1 or data processing system 200 shown in FIG. 2.

The pseudo code shown in FIG. 9 shows that, in the C or C++ programming languages, points-to primitives are created from address-of operations. In the example shown in FIG. 9, the pointer assignment generates the points-to primitive (pi, $i_c$) where "c" is the coordinate of the assignment in the program source code. Points-to primitives, such as the one generated with respect to FIG. 9, are used by the exemplary embodiments in FIGS. 11-14 when performing points-to analysis. The illustrative embodiments herein make use of a directed graph to represent the result of the points-to analysis.

A directed graph is a graph G={V, E} where: V is the set of graph vertices and E is the set of graph edges. Given an edge e in E connecting the pair (v1, v2) of vertices in V, e is considered directed from v1 to v2. The vertex v1 is the source vertex while the vertex v2 is the destination vertex.

In an illustrative method of the embodiments described herein, the process begins as the compiler receives source code. The compiler then performs syntactic and semantic analysis. During semantic analysis, assignments involving memory access commands are collected and a set of points-to primitives is identified. An example of a points-to primitive can be seen in FIG. 9.

The compiler infers the aliasing rules that apply to the program by reading a command line option or parsing a user directive in the program source code. The compiler then parses the program source code to an internal representation and performs semantic analysis on the program statements.

The compiler also annotates a directed graph with coordinate information. Coordinate information gives the location in the source code of relevant program statements. In an illustrative embodiment, coordinate information includes a file name of the source code and line and column number of the source code. During this step, the rules for annotating a points-to graph are created. Next, the compiler propagates coordinate information in the directed graph across the graph edges.

FIG. 10 is a flowchart of an algorithm for detecting and reporting possible violations of aliasing rules in source code, in accordance with an illustrative embodiment. The process shown in FIG. 10 can be implemented in a data processing system, such as data processing system 100 shown in FIG. 1 or data processing system 200 shown in FIG. 2. In particular, the process shown in FIG. 11 can be implemented using a compiler, such as compiler 302 shown in FIG. 3.

The process begins as the compiler identifies a set of indirect memory references in the source code (step 1000). The compiler also generates points-to records for the source code (step 1002). The compiler validates the set of indirect memory references using the points-to records and the aliasing rule in effect to determine if a potential aliasing problem exits. The compiler also identifies a first indirect memory reference having this potential aliasing problem, where the first indirect memory reference is in the set of indirect memory references (step 1004). The compiler generates a report identifying the location within the source code associated with the first indirect memory reference (step 1006). The compiler causes the report to be stored in a memory of a data processing system (step 1008). The process terminates thereafter.

Figure 11:
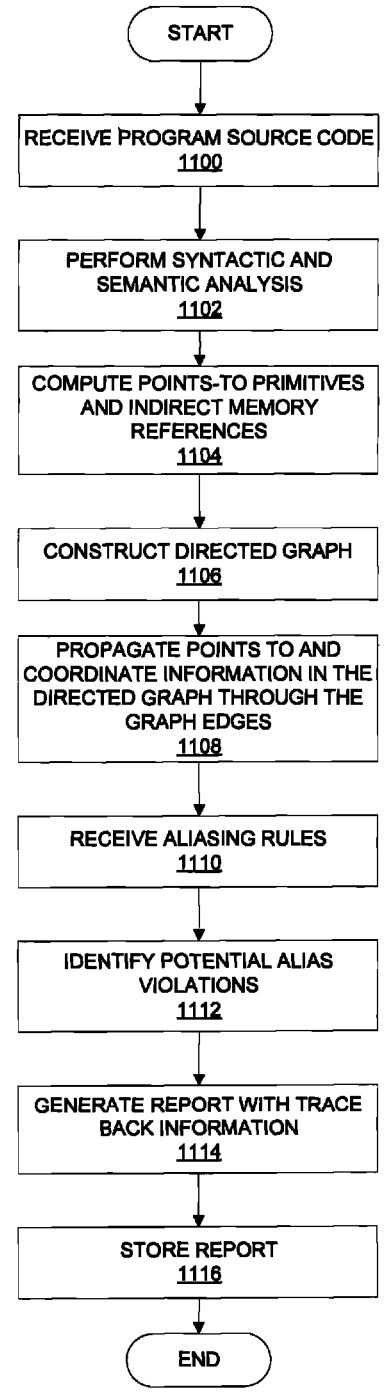
FIG. 11 is a flowchart illustrating a process of facilitating debugging of source code in accordance with an illustrative embodiment.

FIG. 11 is a flowchart illustrating a process of facilitating debugging of source code in accordance with an illustrative embodiment. The process shown in FIG. 11 can be implemented in a data processing system, such as data processing system 100 shown in FIG. 1 or data processing system 200 shown in FIG. 2. The process shown in FIG. 11 can be implemented using a compiler, such as compiler 302 shown in FIG. 3.

The process begins as the compiler receives program source code (step 1100) and performs syntactic and semantic analysis (step 1102). The compiler then computes points-to primitives and indirect memory references (step 1104).

The compiler then constructs a directed graph (step 1106). The compiler propagates points-to information and coordinate information in the directed graph through edges (step 1108). The compiler then receives aliasing rules (step 1110). The compiler identifies potential alias violations (step 1112) and generates a report with trace back information (step 1114). Finally, the compiler stores the report in a memory (step 1116), and the process terminates thereafter.

Figure 12:
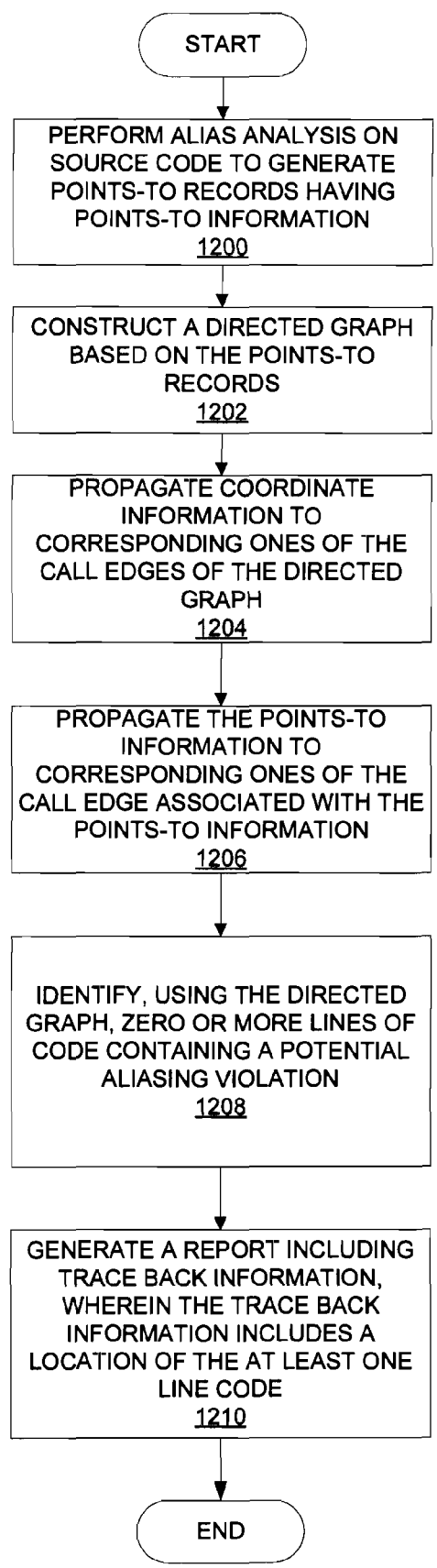
FIG. 12 is a flowchart illustrating a process for facilitating debugging of code in accordance with an illustrative embodiment.

FIG. 12 is a flowchart illustrating a process for facilitating debugging of code in accordance with an illustrative embodiment. The process shown in FIG. 12 can be implemented in a data processing system, such as data processing system 100 shown in FIG. 1 or data processing system 200 shown in FIG. 2. The process shown in FIG. 12 can be implemented using a compiler, such as compiler 302 shown in FIG. 3.

The process begins as the compiler performs alias analysis on source code to generate points-to records having points-to information (step 1200). The compiler then constructs a directed graph based on the points-to records (step 1202). The compiler propagates coordinate information in the directed graph to corresponding call edges of the directed graph (step 1204). The compiler also propagates the points-to information to corresponding ones of the call edges associated with the points-to information (step 1206).

The compiler then identifies, using the directed graph, zero or more lines of code containing a potential aliasing violation (step 1208). That is, the compiler may not identify any lines of code containing a potential aliasing violation, or it may identify at least one line of code containing a potential aliasing violation. It will be appreciated that where the compiler identifies at least one line of code containing a potential aliasing violation, the at least one line of code is in the source code. The complier then generates a report comprising trace back information, wherein the trace back information comprises a location of the at least one line of code (step 1210). Finally, the compiler stores the report in a memory (step 1212).

Figure 13:
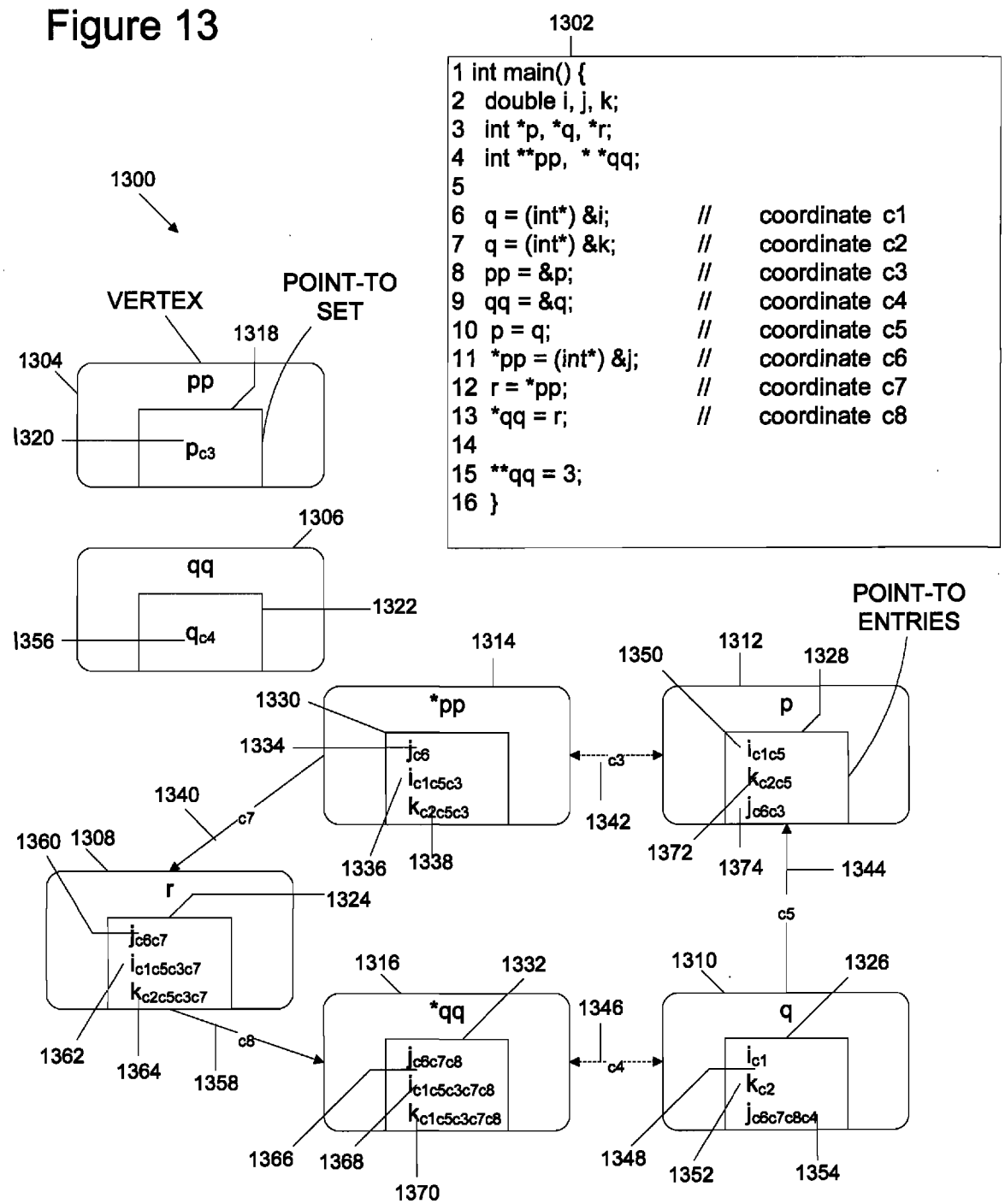
FIG. 13 shows a directed graph and associated C/C++ pseudo code in accordance with an illustrative embodiment.

FIG. 13 shows directed graph 1300, which is based off of pseudo code 1302. In particular, directed graph 1300 can be constructed from pseudo code 1302 to evaluate the points-to set in pseudo code 1302. Directed graph 1300 can be implemented using a data processing system, such as data processing system 100 shown in FIG. 1 or data processing system 200 shown in FIG. 2.

The directed graph of FIG. 13 shows a number of vertices, such as vertex 1304. A vertex can represent a direct memory reference, for example vertices "pp," 1304 "qq," 1306 "r," 1308 "q," 1310 and "p" 1312 are direct vertices. Similarly, a vertex can represent an indirect memory reference, such as vertices "*pp" 1314 and "*qq" 1316. An indirect vertex represents the memory region obtained by dereferencing another vertex in directed graph 1300.

Each vertex shown in FIG. 13 contains a square box representing the points-to set for the corresponding vertex shown by a box with rounded corners. For example, vertex "pp" 1304 in the shown rounded box contains points-to set 1318 in the shown square box. In turn, points-to set 1318 contains points-to entry "$p_{c3}$" 1320. Each points-to entry is annotated with a sequence of source coordinates describing program locations in source code 1302. Thus, points-to entry "$p_{c3}$" 1320 shows a sequence of source coordinates that reference line 8 in pseudo code 1302, which corresponds to coordinate c3. Other points-to entries have references which refer to different, or the same, coordinates. Points-to entries with multiple subscripts refer to multiple coordinates and thus multiple lines in pseudo code 1302.

Thus, vertex "qq" 1306 contains points-to set 1322, vertex "r" 1308 contains points-to set 1324, vertex "q" 1310 contains points-to set 1326, vertex "p" 1312 contains points-to set 1328, vertex "*pp" 1314 contains points-to set 1330, and vertex "*qq" 1316 contains points-to set 1332.

As shown in FIG. 13, a points-to set can contain more than one points-to entry. For example, points-to set 1330 of vertex "*pp" 1314 contains points-to entries "$i_{c6}$" 1334, $i_{c1c5c3}$ 1336, and "$k_{c2c5c3}$" 1338, which all refer to corresponding lines in pseudo code 1302. For example, points-to entry "$k_{c2c5c3}$" 1338 refers to lines 7, 8, and 10 in pseudo code 1302.

Edges in directed graph 1300 represent assignments between vertices. An edge in directed graph 1300 may be a directed edge. With respect to FIG. 13, the line 1340 connecting vertex "*pp" 1314 to vertex "r" 1308 is a directed edge. The directed edge 1340 connects two vertices, with the source vertex being vertex "*pp" 1314 and the destination vertex being vertex "r" 1308. Edges are annotated with the name of the two vertices the edges connect. Thus, for example, directed edge 1340 is designated as ($e_{*pp,r}$). Edges in directed graph 1300 also have a sequence of associated source coordinates. In directed graph 1300, edges are annotated with the coordinates corresponding to their associated program statements.

Edges in directed graph 1300 can be real or implicit. For example, edge 1340 "$e_{*pp,r}$," connecting vertex "*pp" 1314 to vertex "r" 1308 is a real edge. In contrast, edge 1342 "$e_{*pp,t}$," connecting vertex "*pp" 1314 and vertex "p" 1312 is an implicit edge.

Generally, for each points-to primitive (r, $p_c$) in source code 1302 there exists a graph vertex "$v_r$" corresponding to reference "r" with "$p_c$" in the points-to set of graph vertex "$v_r$". The points-to set entry "$p_c$" is annotated with coordinate "c." For example, line 6 in pseudo code 1302 causes "$i_{c1}$" to be added to the points-to set of vertex "q" 1310.

For each assignment x=y with source coordinates "c" in source code 1302, where x and y are memory regions, there exists a real edge $e_{y,x}$ from vertex "$v_y$" to the vertex "$v_x$" with coordinates "c," where "$v_x$" and "$v_y$" correspond to memory regions "x" and "y" respectively. For example, line 10 in pseudo code 1302 causes the edge 1344 $e_{q,p}$ to be added to directed graph 1300 and to be annotated with coordinate "c5." Edge 1344 $e_{q,p}$ corresponds to the edge between vertex "q" 1310 and vertex "p" 1312.

Additionally, if memory region "x" or "y" is accessed via an indirect memory reference "*r," there exists an indirect vertex in graph 1300 corresponding to indirect reference "*r." For example, line 11 in pseudo code 1302 causes indirect vertex "*pp" 1314 corresponding to vertex pp 1304 to be added to directed graph 1300.

Implicit edges can be identified as follows: Let vertex "*r" be the indirect vertex corresponding to vertex "r." For any entry "p" in the points-to set of "r," there exists implicit edges $e_{*r,p}$ and $e_{p,*r}$ in the graph with sequence coordinates of the points-to entry "p." For example, line 13 of pseudo code 1302 causes edge 1346 $e_{*qq,q}$, $e_{q,*qq}$ to be added to directed graph 1300, because vertex "*qq" 1310 contains "q" in points-to set 1322.

An example of propagating coordinates information in directed graph 1300 is now given. Propagating coordinates information in directed graph 1300 corresponds to step 1204 in FIG. 12.

Directed graph 1300 has now been annotated with the source coordinate information as described above. For all paths "P" from any vertex "$v_1$" in directed graph 1300 to any other vertex "$v_2$" in directed graph 1300, the following actions are taken. If path "P" does not traverse two consecutive implicit edges, then the points-to set of "$v_2$" is augmented with the points-to set of "$v_1$" by propagating the entries in the points-to set of "$v_1$" across the edges connecting "$v_1$" to "$v_2$." Additionally, a points-to entry is propagated from source vertex "$v_s$" to destination vertex "$v_d$" across the connecting edge "$e_{s,d}$" by appending the edge source coordinate sequence to the new points-to entry added to the destination vertex "$v_d$" points-to set.

As described above, edges are annotated with the coordinates of the program statement or statements that cause the edges to be added to directed graph 1300. Therefore, annotating a points-to entry with a coordinate sequence allows recording, in the entry itself, of the path taken to reach a destination vertex from a source vertex. An analysis of the points-to set of any vertex can then be used to determine the program statements responsible for the presence of an entry in the vertices points-to set.

As an example, points-to entry "$i_{c1}$" 1348 in the points-to set of vertex "q" 1310 is propagated to the points-to set of vertex "p" 1312 by traversing edge 1344 connecting the two vertices. Because edge 1344 is annotated with coordinate "c5," the entry added to points-to set 1328 of vertex "p" 1312 is annotated with both the original coordinate "c1" and the edge coordinate "c5." By analyzing points-to entry "$i_{c1c5}$" 1350 of vertex "p," 1312 an inference can be made that "p" may point to "i," because of the program statements having coordinates "c1" and "c5."

The identification of possible aliasing rule violations is now described with respect to FIG. 13. In this example, "Av" is defined as the initially empty set of all possible aliasing violations in pseudo code 1302. Thus, "Av" can be referred to as the violation set. For all vertices "$v_r$" in directed graph 1300 the following actions are taken. Let "p" be an entry in the points-to set of "$v_r$." If, according to the aliasing rules in effect, the memory region described by "p" is not aliased to the memory region represented by the indirect vertex "*$v_r$" corresponding to vertex "$v_r$," then add the pair ($v_r$, p) to Av.

Additionally, let "L" be the set of indirect memory accesses in pseudo code 1302. The set "L" represents the actual indirect memory references in pseudo code 1302. For all elements of "*r" of "L," the following action is taken. Let "$v_r$" be a vertex in directed graph 1300 corresponding to indirect memory access "*r." For each pair, ($v_r$, P) in the violation set "Av," perform the following actions. First, report the illegal dereference "*r." Second, report the aliasing rule that dereference "*r" violates. Third, let [C] be the coordinate sequence with which "p" is annotated. For each coordinate "c" in [C] emit "c" in the report.

The sequence of source coordinates reported in the diagnostic may be emitted in different order then they appear in [C]. The sequence of source coordinates for the diagnostic may be emitted from any path by which the points-to primitive entry p is propagated to the vertex.

The algorithm described above first collects all possible aliasing violations in the violation set "Av." The algorithm then checks whether an actual dereference in pseudo code 1302 appears in the violation set "Av." If the violation set "Av" contains the vertex "$v_r$" corresponding to the indirect memory access "*r," the algorithm diagnoses the illegal memory access by emitting the trace back information from the coordinates sequence recorded in element "$v_r$."

As an example, consider the dereference "*qq" at line 13 in pseudo code 1302. The vertex corresponding to the dereference is vertex "q" 1310 because "qq" contains "q" in its points-to set. The points-to set for vertex "q" 1310 contains points-to entries "$i_{c1}$," 1348, "$k_{c2}$," 1352 and "$j_{c6c7c8c4}$" 1354.

Points-to entry "$j_{c6c7c8c4}$" 1354 is considered first. By checking the alias rules in effect, a determination can be made that "*q," which has type "int," is not aliased to "j," which has type "double" (assuming the aliasing rule in effect does not allow an expression of type "double" to alias an expression of type "mint"). At this point in the algorithm, a diagnostic message is reported indicating that the indirect memory access "*qq" at line 13 of pseudo code 1302 is illegal. In the resulting report, statements at coordinates c4, c6, c7, and c8 are listed in the trace back.

When directed graph 1300 is initially constructed, the initial points-to sets do not include points-to entries. The points-to sets are initially populated by analyzing the source statements generating points-to primitives in pseudo code 1302, such as statements at lines 6, 7, 8, 9, and 11. Then, the propagation of points-to sets through edges adds points-to entries to the points-to sets of each corresponding vertex.

Each points-to entry in each vertex has corresponding trace back information. Note that vertex "r" 1308, vertex "q" 1310, vertex "p" 1312, vertex "*pp" 1314, and vertex "*qq" 1316, each contain a point-to entry associated with "j." Points-to entry "j" collects trace back information as the points-to entry is propagated from vertex "*pp" 1314 (where it is initially added) through vertex "r" 1308, vertex "*qq" 1316, and vertex "q" 1310. Thus, in vertex "*qq" 1316, the points-to entry "j" has trace back information including coordinates c6-c7-c8. Therefore, the trace back information for "j" refers to lines 11, 12, and 13 in pseudo code 1302. This trace back information can be reported to a user in order to assist the user to find the possible aliasing violation in pseudo code 1302. An exemplary report based on this trace back information can be presented in a format similar to the report shown in FIG. 8.

The algorithm described above can be described with respect to the following process. First, syntactic and semantic analysis is performed. Then, in annotating directed graph 1300 with coordinate information, the following actions are taken to populate directed graph 1300 with the initial points-to set.

The initial points-to entries in the points-to sets include "$i_{c1}$" 1348 in vertex "q" 1310, "$j_{c6}$" 1334 in vertex "*pp" 1314, "$k_{c2}$" 1352 in vertex "q" 1310, "$p_{c3}$" 1320 in vertex "pp" 1304, and "$q_{c4}$" 1356 in vertex "qq" 1306. These initial points-to entries are generated as follows. From line 6 in pseudo code 1302, "i" is added with coordinate c1 to points-to set of vertex "q" 1310. For line 7 in pseudo code 1302, "k" is added with coordinate c2 to the points-to set of vertex "q" 1310. For line 8 of pseudo code 1302, "p" is added with coordinate c3 to the points-to set of vertex pp 1304. For line 9 of pseudo code 1302, "q" is added with coordinate c4 to the points-to set of vertex qq 1306. For line 11 of pseudo code 1302, "j" is added with coordinate c6 to points-to set 1330 of vertex "*pp" 1314. This completes the initial set of points-to entries. Then, edges are added as follows. For line 10 of pseudo code 1302, real edge 1344 is added with coordinate c5 from vertex "q" 1310 to vertex "p" 1312. For line 12 of pseudo code 1302, real edge 1340 is added with coordinate c7 from vertex "*pp" 1314 to vertex "r" 1308. For line 13 of pseudo code 1302, real edge 1358 is added with coordinate c8 from vertex "r" 1308 to vertex "*qq" 1316.

An implicit edge is added between vertex "*pp" 1314 and any entry in points-to set 1318 of vertex "pp" 1304. Thus, implicit bidirectional edge 1342 is created between vertex "*pp" 1314 and vertex "p" 1312 with coordinate c3.

Similarly, an implicit edge is added between vertex "*qq" 1316 and entries in points-to set 1322 of vertex "qq" 1306. Implicit bidirectional edge 1346 between vertex "*qq" 1316 and vertex "q" 1310 is created with coordinate c4. With respect to line 15 of pseudo code 1302, dereference "**qq" is stored in the set "L" of indirect memory access.

Next, the coordinate information is propagated. Propagation of points-to sets through edges adds points-to entries to the points-to sets of each vertex in directed graph 1300. In particular, points-to entries "$i_{c1c5c3}$" 1336 and "$k_{c2c5c3}$" 1338 are added to points-to set 1330 in vertex "*pp" 1314; points-to entries "$j_{c6c7}$" 1360, "$i_{c1c5c3c7}$" 1362, and "$k_{c2c5c3c7}$" 1364 are added to points-to set 1324 in vertex "r" 1308; points-to entries "$j_{c6c7c8}$" 1366, "$i_{c1c5c3c7c8}$" 1368, and "$k_{c1c5c3c7c8}$" 1370 are added to points-to set 1332 in vertex "*qq" 1316; points-to entry "$j_{c6c7c8c4}$" 1354 is added to points-to set 1326 in vertex "q" 1310; and points-to entries "$i_{c1c5}$" 1350, "$k_{c2c5}$" 1372, and "$j_{c6c3}$" 1374 are added to points-to set 1328 of vertex "p" 1312.

Each points-to entry in each vertex has its own trace back information. For example, points-to reference "j" collects trace back information as points-to entry "j" is propagated from vertex "*pp" 1314 through vertex "r" 1308, vertex "*qq" 1316 and vertex "q" 1310. For example, in vertex "*qq" 1316 the points-to entry "j" has trace back information c6-c7-c8. This trace-back information refers back to coordinates c6, c7, and c8, which in turn refer to lines 11, 12, and 13 in pseudo code 1302.

Although not shown in FIG. 13 for simplicity, points-to entry "j" could be further propagated from vertex "q" 1310 to vertex "p" 1312 which would result in points-to entry "j" in vertex "p" 1312 having trace back information c6-c7-c8-c4-c5. This would be in addition to the separate points-to entry "j" 1374 in vertex "p" 1312 having trace back information c6-c3 resulting from propagation from vertex "*pp" 1314 along virtual edge c3 1342 to vertex "p" 1312.

Next, the illustrative algorithm described herein detects and reports violations. After all points-to sets are propagated, the indirect dereference "**qq" from the set "L" of indirect memory accesses is processed by adding vertex "*qq" 1316 to the violation set "Av." The violation set "Av" contains [(*qq, $j_{c6c7c8}$), (*qq, $i_{c1c5c3c7c8}$), (*qq, $k_{c1c5c3c7c8}$)] because the entries in points-to set 1316 of *qq (i, j, k) of type "double" do not alias the type "int" of the indirect access "qq." Thus, indirect access command qq in line 15 of pseudo code 1302 is an aliasing violation, under the determined aliasing rules. The aliasing violation is presented to the user in the form of a report.

The report can take the form of the output shown in FIG. 8. The report can also include trace back information that allows a user to relatively easily identify line 15 in pseudo code 1302 as the source of the aliasing violation. In this way, a user can correct the aliasing violation in the source code 1302 and then recompile source code 1302 using an optimizing compiler, after having eliminated the aliasing violation.

Figure 14:
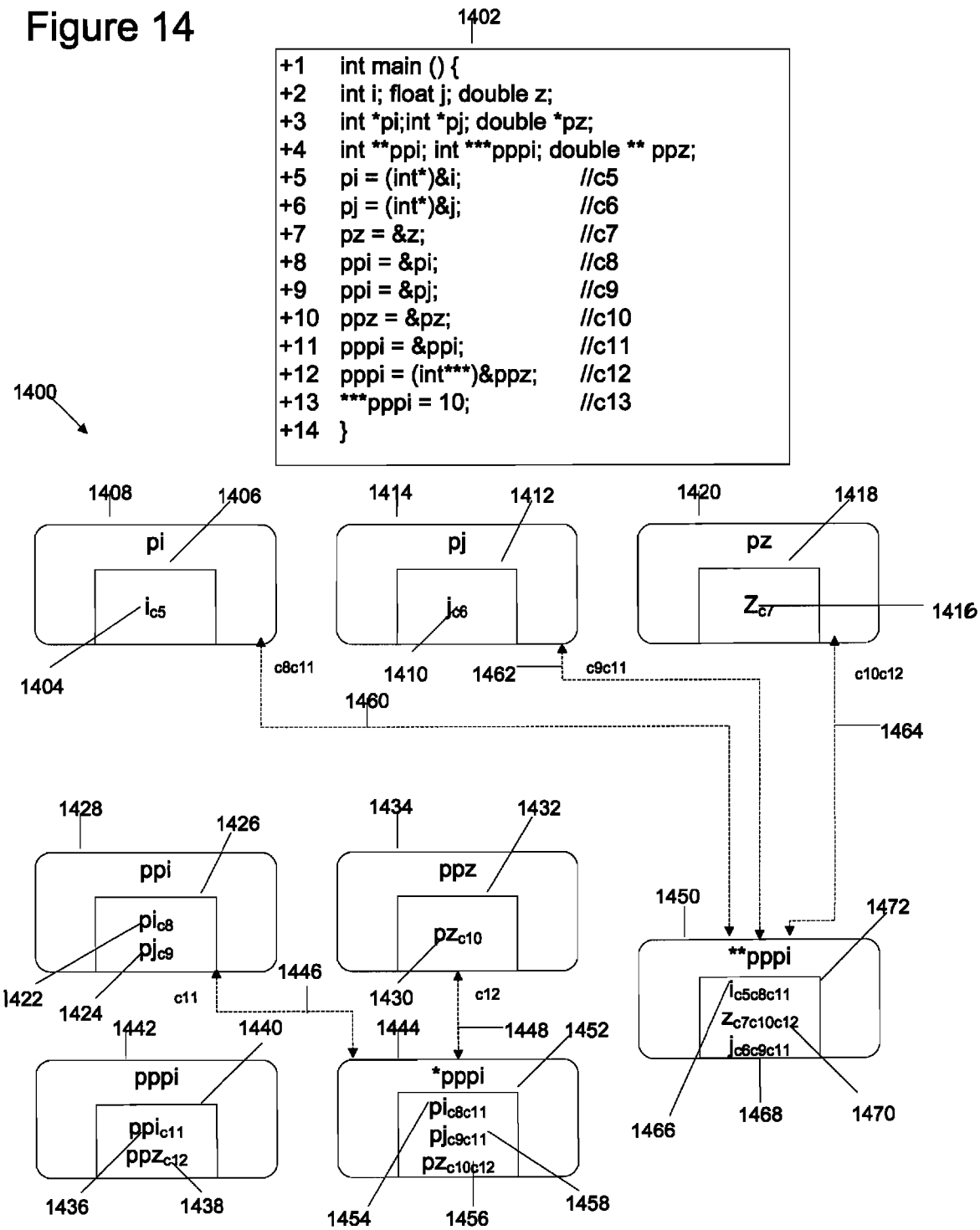
FIG. 14 shows a directed graph and associated C/C++ pseudo code in accordance with an illustrative embodiment.

FIG. 14 shows a directed graph and associated C/C++ pseudo code, in accordance with an illustrative embodiment. The illustrative example shown in FIG. 14 also can be used to illustrate detecting and reporting of violations of alias rules, such as described in FIG. 12. Directed graph 1400 shown in FIG. 14 can be implemented in a data processing system, such as data processing system 100 shown in FIG. 1 and data processing system 200 shown in FIG. 2. Directed graph 1400 is similar to, but different than directed graph 1300 of FIG. 13. As with directed graph 1300, directed graph 1400 is obtained by propagating the source coordinates, as described above.

The example in FIG. 14 is described with respect to the exemplary algorithms described herein. First, syntactic and semantic analysis is performed, points-to primitives and dereferences are computed, and a directed graph is constructed by annotating the directed graph with coordinate information. During these steps directed graph 1400 is populated with an initial points-to set.

From line 5 in pseudo code 1402, points-to entry "$i_{c5}$" 1404 with coordinate c5 is added to points-to set 1406 of vertex "pi" 1408. From line 6 of pseudo code 1402, points-to entry "$j_{c6}$" 1410 with coordinate c6 is added to points-to set 1412 of vertex "pj" 1414. From line 7 in pseudo code 1402, points-to entry "$z_{c7}$" 1416 with coordinate c7 is added to points-to set 1418 of vertex "pz" 1420. From lines 8 and 9 in pseudo code 1402, points-to entries "$pi_{c8}$" 1422, with coordinate c8, and "$pj_{c9}$" 1424, with coordinate c9, are added to points-to set 1426 of vertex "ppi" 1428. From line 10 of pseudo code 1402, points-to entry "$pz_{c10}$" 1430 with coordinate c10 is added to points-to set 1432 of vertex "ppz" 1434. From lines 11 and 12 of pseudo code 1402, points-to entries "$ppi_{c11}$" 1436, with coordinate c11, and "$ppz_{c12}$" 1438, with coordinate c12, are added to points-to set 1440 of vertex "pppi" 1442. From line 13 of pseudo code 1402, dereferences "*pppi," "pppi," and "*pppi" are stored in the set "L" of indirect memory accesses.

An implicit bidirectional edge is added between vertex "*pppi" 1444 and any entry in points-to set 1442 of vertex "pppi" 1442. Thus, implicit bidirectional edge 1446 exists between vertex "*pppi" 1444 and vertex "ppi" 1428 with coordinate c11. Additionally, implicit bidirectional edge 1448 is added between vertex "*pppi" 1444 and vertex "ppz" 1434 with coordinate c12.

Next in directed graph 1400, the coordinate information is propagated. Propagation of points-to sets through edges adds certain points-to entries and coordinates. Specifically, points-to entries "$pi_{c8c11}$" 1454, "$pj_{c9c11}$" 1456, and "$pz_{c10c12}$" 1458 are added to points-to set 1452 of vertex "*pppi" 1444.

Next, an implicit edge is added between vertex "pppi" 1450 and any entry in points-to set 1452 of vertex "pppi" 1444. Points-to set 1452 of vertex "*pppi" 1444 contains points-to entries "$pi_{c8c11}$" 1454, "$pj_{c9c11}$" 1456, and "$pz_{c10c12}$" 1458. Thus, implicit bidirectional edge 1460 is added between vertex "ppi" 1450 and vertex "pi" 1408 with coordinate c8c11. Moreover, implicit bidirectional edge 1462 also is added between vertex "pppi" 1450 and vertex "pj" 1414 with coordinate c9c11. Finally, implicit bidirectional edge 1464 exists between vertex "pppi" 1450 and vertex "pz" 1420 with coordinate c10c12. Finally, points-to entries "$i_{c5c8c11}$" 1466, "$z_{c7c10c12}$" 1470, and "$j_{c6c9c11}$" 1468 are added to points-to set 1472 in vertex "pppi" 1450.

Each points-to entry in each vertex has its own trace back information. Note how point-to entry "$pi_{c8}$" 1422 collects trace back information as it is propagated from vertex "ppi" 1428 through implicit bidirectional edge 1446 to vertex "*pppi" 1444. For example, in vertex "*pppi" 1444, the points-to entry "$pi_{c8c11}$" 1454 has trace back coordinates c8-c11. These trace back coordinates refer back to lines 8 and 11 of pseudo code 1402.

After propagating "$i_{c5}$" from vertex "pi" 1408 to vertex "pppi" 1450 through implicit edge 1460, points-to entry "$i_{c5}$" cannot be propagated consecutively through some other implicit edge. For example, points-to entry "$i_{c5}$" 1404 in vertex "pi" 1408 cannot move to vertex "pppi" 1405 and then to vertex "pj" 1414 because points-to entry "$i_{c5}$" 1404 would be violating a rule regarding propagation through two consecutive implicit edges. Thus, vertex "pj" 1414 cannot point to points-to entry "$i_{c5}$" 1404.

In the next step, aliasing violations are detected and reported. After all points-to sets are propagated, the indirect references *pppi, pppi and *pppi are processed from the set "L" of indirect memory accesses by adding *pppi, pppi, and *pppi to the violation set "Av." The violation set Av contains [(*pppi, $ppz_{c12}$), (*pppi, $ppi_{c11}$), (pppi, $pi_{c8c11}$), (pppi, $p_{jc9c11}$), (pppi, $pz_{c10c12}$) (*pppi, $i_{c5c8c11}$), (*pppi, $z_{c7c10c12}$), (*pppi, $j_{c6c9c11}$)].

Thus, points-to entry "$ppz_{c12}$" 1438 of type "double" in points-to set 1440 of vertex "pppi" 1442 does not alias the type "int" of the indirect access *pppi. For this reason, trace back c12 is emitted to the report, assuming that according to the current alias rules "int" does not alias "double".

Additionally, points-to entry "$pz_{c10c12}$" 1458 of type "double*" in points-to set 1452 of vertex "*pppi" 1444 does not alias the type "int*" of the indirect access **pppi. Thus, the trace back c10c12 is emitted in the resulting report, assuming that according to the current alias rules "int*" does not alias "double*".

Additionally, points-to entry "$z_{c7c10c12}$" 1470 of type "double" in points-to set 1472 of vertex "pppi" 1450 does not alias the type "int" of the indirect access *pppi. Therefore, trace back c7c10c12 is emitted in the resulting report, assuming that according to the current alias rules "int" does not alias "double".

Finally, points-to entry "$j_{c6c9c11}$" 1468 of type "float" in points-to set 1472 of vertex "pppi" 1450 does not alias the type "int" of the indirect access *pppi. Thus, trace back c6c9cll is emitted in the resulting report, assuming that according to the current alias rules "int" does not alias "float".

The illustrative embodiments described herein allow detection of type-based aliasing rules at compile time. Furthermore, the illustrative embodiments described herein allow a trace back to be determined at compile time. The trace back identifies particular lines in the source code that may contain aliasing violations. A user can then correct the aliasing violations in the original source code and then recompile the source code using the optimizing compiler. Thus, the optimizing compiler can maximize the efficiency of the resulting executable code.

The invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for facilitating debugging of source code, the computer implemented method comprising:
   identifying a set of indirect memory references in the source code;
   generating points-to records for the source code;
   validating the set of indirect memory references using the points-to records and an aliasing rule to identify zero or more indirect memory references having a potential aliasing problem, wherein in a case in which the zero or more indirect memory references comprise at least a first indirect memory reference, the first indirect memory reference is in the set of indirect memory references; and
   responsive to a determination that the zero or more indirect memory references comprise at least one indirect memory reference, generating a report identifying at least one location in the source code associated with the at least one indirect memory reference and storing the report.

2. The computer implemented method of claim 1 wherein the report further includes trace back information.

3. The computer implemented method of claim 2 wherein the trace back information comprises a program symbol which the first indirect memory reference is not allowed to alias according to the aliasing rule, and wherein the program symbol refers to a memory region to which the first indirect memory reference also refers.

4. The computer implemented method of claim 2 wherein the trace back information comprises a sequence of statement locations in the source code related to the first indirect memory reference.

5. The computer implemented method of claim 2 wherein the trace back information comprises a program symbol which the first indirect memory reference is not allowed to alias according to the aliasing rule, wherein the program symbol refers to a memory region to which the first indirect memory reference also refers, and wherein the trace back information comprises a sequence of statement locations in the source code related to the first indirect memory reference.

6. The computer implemented method of claim 1 wherein validating is further performed using a directed graph built using the points-to records.

7. A computer implemented method for facilitating debugging of source code, the computer implemented method comprising:
   performing an alias analysis of the source code to generate points-to records having points-to information;
   constructing a directed graph based on the points-to records, wherein the directed graph comprises edges and points-to entries;
   annotating the edges and points-to entries in the directed graph with coordinate information;
   propagating the points-to entries in the directed graph along the edges;
   applying an aliasing rule to identify, using the directed graph, zero or more lines of code containing a potential aliasing violation, wherein in a case in which the zero or more lines of code comprise at least one line of code, the at least one line of code is in the source code;
   generating a report, wherein the report comprises an identification of the zero or more lines of code; and
   storing the report.

8. The computer implemented method of claim 7 wherein when the zero or more lines of code comprise at least one line of code, the report further comprises trace back information, and wherein the trace back information comprises locations of program statements in the source code that lead to the potential aliasing violation.

9. A computer program product comprising:
   a non-transitory computer usable medium having computer usable program code for facilitating debugging of source code, the computer program product including:
   computer usable program code for identifying a set of indirect memory references in the source code;
   computer usable program code for generating points-to records for the source code;
   computer usable program code for validating the set of indirect memory references using the points-to records and an aliasing rule to identify zero or more indirect memory references having a potential aliasing problem, wherein in a case in which the zero or more indirect memory references comprise at least one indirect memory reference, the at least one indirect memory reference is in the set of indirect memory references; and
   computer usable program code for, responsive to a determination that the zero or more indirect memory references comprise at least a first indirect memory reference, generating a report identifying at least one location in the source code associated with the first indirect memory reference.

10. The computer program product of claim 9 wherein the report further includes trace back information.

11. The computer program product of claim 10 wherein the trace back information comprises a program symbol which the first indirect memory reference is not allowed to alias according to the aliasing rule, and wherein the program symbol refers to a memory region to which the first indirect memory reference also refers.

12. The computer program product of claim 10 wherein the trace back information comprises a sequence of statement locations in the source code related to the first indirect memory reference.

13. The computer program product of claim 10 wherein the trace back information comprises a program symbol which the first indirect memory reference is not allowed to alias according to the aliasing rule, wherein the program symbol refers to a memory region to which the first indirect memory reference also refers, and wherein the trace back information comprises a sequence of statement locations in the source code related to the first indirect memory reference.

14. The computer program product of claim 9 wherein the computer usable program code for validating uses a directed graph built using the points-to records.

15. A computer program product comprising:
   a non-transitory computer usable medium having computer usable program code for facilitating debugging of source code, the computer program product including:
   computer usable program code for performing an alias analysis of the source code to generate points-to records having points-to information;
   computer usable program code for constructing a directed graph based on the points-to records, wherein the directed graph comprises edges and points-to entries;

computer usable program code for annotating the edges and points-to entries in the directed graph with coordinate information;

computer usable program code for propagating the points-to entries in the directed graph along the edges;

computer usable program code for applying an aliasing rule to identify, using the directed graph, zero or more lines of code containing a potential aliasing violation, wherein in a case in which the zero or more lines of code comprise at least one line of code, the at least one line of code is in the source code; and computer usable program code for generating a report, wherein the report comprises an identification of the zero or more lines of code.

16. The computer program product of claim 15 wherein when the zero or more lines of code comprise at least one line of code, the report further comprises trace back information, and wherein the trace back information comprises locations of program statements in the source code that lead to the potential aliasing violation.

17. A data processing system comprising:
a bus;
at least one processor coupled to the bus;
a non-transitory computer usable medium coupled to the bus, wherein the non-transitory computer usable medium contains a set of instructions for facilitating debugging of source code, wherein the at least one processor is adapted to carry out the set of instructions to:
identify a set of indirect memory references in the source code;
generate points-to records for the source code;
validate the set of indirect memory references using the points-to records and an aliasing rule to identify zero or more indirect memory references having a potential aliasing problem, wherein in a case in which the zero or more indirect memory references comprise at least one indirect memory reference, the at least one indirect memory reference is in the set of indirect memory references; and
responsive to a determination that the zero or more indirect memory references comprise at least a first indirect memory reference, generate a report identifying at least one location in the source code associated with the first indirect memory reference.

18. The data processing system of claim 17 wherein the report further includes trace back information.

19. The data processing system of claim 18 wherein trace back information comprises a program symbol which the first indirect memory reference is not allowed to alias according to the aliasing rule, and wherein the program symbol refers to a memory region to which the first indirect memory reference also refers.

20. The data processing system of claim 18 wherein the trace back information comprises a sequence of statement locations in the source code related to the first indirect memory reference.

21. The data processing system of claim 18 wherein the trace back information comprises a program symbol which the first indirect memory reference is not allowed to alias according to the aliasing rule, wherein the program symbol refers to a memory region to which the first indirect memory reference also refers, and wherein the trace back information comprises a sequence of statement locations in the source code related to the first indirect memory reference.

22. The data processing system of claim 17 wherein the at least one processor is adapted to further execute the instructions to validate by using a directed graph built using the points-to records.

23. A data processing system comprising:
a bus;
at least one processor coupled to the bus;
a non-transitory computer usable medium coupled to the bus, wherein the non-transitory computer usable medium contains a set of instructions for facilitating debugging of source code, wherein the at least one processor is adapted to carry out the set of instructions to:
perform an alias analysis of the source code to generate points-to records having points-to information;
construct a directed graph based on the points-to records, wherein the directed graph comprises edges and points-to entries;
annotate the edges and points-to entries in the directed graph with coordinate information;
propagate the points-to entries in the directed graph along the edges;
apply an aliasing rule to identify, using the directed graph, zero or more lines of code containing a potential aliasing violation, wherein in a case in which the zero or more lines of code comprise at least one line of code, the at least one line of code is in the source code; and
generate a report, wherein the report comprises an identification of the zero or more lines of code.

24. The data processing system of claim 23 wherein when the zero or more lines of code comprise at least one line of code, the report further comprises trace back information, and wherein the trace back information comprises locations of program statements in the source code that lead to the potential aliasing violation.

* * * * *